US005821956A

United States Patent [19]

Kroon et al.

[11] Patent Number: 5,821,956

[45] Date of Patent: Oct. 13, 1998

[54] METHOD TO IMPROVE SOLID INK OUTPUT RESOLUTION

[75] Inventors: Stephen M. Kroon, Sherwood; Kevin A. Draz, Newberg; C. Wayne Jaeger, Beaverton, all of Oreg.

[73] Assignee: Tektronix, Inc., Wilsonville, Oreg.

[21] Appl. No.: 756,149

[22] Filed: Nov. 27, 1996

[51] Int. Cl.[6] .................................. B41J 2/21; B41J 2/17; G01D 11/00

[52] U.S. Cl. .................................. 347/43; 347/98; 347/99

[58] Field of Search .................................. 347/43, 74, 98, 347/99, 105, 41

[56] References Cited

U.S. PATENT DOCUMENTS

| | | | |
|---|---|---|---|
| 4,390,369 | 6/1983 | Merritt et al. | 106/31 |
| 4,745,420 | 5/1988 | Gerstenmaier | 347/101 |
| 5,092,235 | 3/1992 | Rise | 100/168 |
| 5,182,571 | 1/1993 | Creagh et al. | 347/98 |
| 5,259,873 | 11/1993 | Fujioka et al. | 347/99 |
| 5,371,531 | 12/1994 | Rezanka et al. | 347/43 |
| 5,372,852 | 12/1994 | Titterington | 427/288 |
| 5,389,958 | 2/1995 | Bui et al. | 347/103 |
| 5,428,377 | 6/1995 | Stoffel et al. | 347/15 |
| 5,485,183 | 1/1996 | Zandian et al. | 347/41 |
| 5,560,765 | 10/1996 | Kaisha | 106/31.3 |

FOREIGN PATENT DOCUMENTS

| | | | |
|---|---|---|---|
| A37027 | 11/1993 | Australia | 347/74 |

*Primary Examiner*—N. Le
*Assistant Examiner*—Thinh Nguyen
*Attorney, Agent, or Firm*—Ralph D'Alessandro

[57] ABSTRACT

A method of printing with phase change ink on an ink jet printer that contains ink dots in an imaged area by placing clear or the lightest level of color ink drops in non-imaged areas adjacent the ink drops in the imaged area is disclosed. The method reduces dot gain in phase change ink drops when the image is fused. The method is especially useful for grey scale printing applications in direct or offset printing.

15 Claims, 2 Drawing Sheets

| | INPUT | | DECREASE INK / OUTPUT | | INCREASE INK |
|---|---|---|---|---|---|
| FIG. 5A | 3 3 3 3 | => | 3 3 3 | | |
| | 2 2 2 2^ | | 2 2 2 3^0 0 | | |
| FIG. 5B | 3 | => | | | |
| | 2 | | 0 0 3 0 0 | | |
| FIG. 5C | 3 3   3 3 3 | => | 3       3 3 | OR | 3 3 0 3 3 3 |
| | 2 2 2 2 2 1 | | 2 3 2 3 2 1 | | 2 2 2 2 2 1 |
| FIG. 5D | 3 3   1 3 1 | => | 3       3 1 | OR | 3 3 0 1 3 1 |
| | 2 2 1 2 2 2 | | 2 3 1 2 2 2 | | 2 2 1 2 2 2 |

METHOD TO IMPROVE SOLID INK OUTPUT RESOLUTION

FIELD OF INVENTION

This invention relates generally to a method of printing using phase change ink and, more specifically, this invention relates to a method that increases the resolution and permits grey scale solid ink output to be achieved.

BACKGROUND OF THE INVENTION

Solid or phase change inks that are solid at ambient temperatures and liquid at elevated operating temperatures employed in ink jet printers have been utilized for an extended period of time. These printers eject liquid phase ink droplets from the print head at an elevated operating temperature. The droplets solidify quickly upon contact with the surface of the receiving substrate to form a predetermined pattern.

Among the advantages of solid ink is the fact that it remains in a solid phase at room temperature during shipping and long-term storage. Problems with clogging in the print head are largely eliminated, or are less prevalent than occur with aqueous based ink jet print heads. The rapid solidification or hardening of the ink drops upon striking the receiving substrates permits high quality images to be printed on a wide variety of printing media.

It is known that printed images formed from deformation of solid inks on receiving substrates during or following the printing process is possible. For example, U.S. Pat. No. 4,745,420 to Gerstenmaier discloses a solid ink that is ejected onto a receiving substrate and subsequently spread by the application of pressure to increase the coverage and minimize the volume of ink required. This has been used in direct solid ink printing. Deformation of solid ink drops also has occurred in direct printing as disclosed in U.S. Pat. No. 5,092,235 to Rise, where a high pressure nip defined by a pair of rollers applies pressure to cold fuse solid ink drops to receiving substrates.

An indirect printing process has been successfully employed with solid ink drops to apply droplets of solid ink in a liquid phase in a predetermined pattern by a print head to a liquid intermediate transfer that is supported by a solid support surface, and then transfer the solid ink after it hardens from the liquid intermediate transfer surface to a final receiving surface. Some deformation of the ink drops occur in the transfer process, as is described in U.S. Pat. No. 5,372,852 to Titterington et al.

Solid ink printing, as with other printing technologies, has its resolution of the final printed image limited by the dot size of the ink. Preferably, the area covered by the printed ink dot should be only slightly larger than the addressable location it is intended to fill. Increasing the addressability without reducing the ink drop size causes detail to be lost as ink spreads into areas not intended to be marked. This can cause areas that are intended to be a checkboard to become a solid fill, for instance.

Alternatively, excessive dot spread of printed ink dots can be used to compensate for other printing problems, such as variability, dot size, and position. If ink drop dots are periodically placed incorrectly or vary in size due to media or printer limitations, artifacts will appear in what should be areas of uniform solid color fill. These artifacts can appear as banding. Increasing the dot size relative to the addressability of the printer will hide these defects, but will decrease the resolution of the printed image. Similarly, where is employed in producing printed images, excessive dot size produces a digital printing version of dot gain.

In solid ink printing, the neighboring or adjacent ink dots or pixels have a substantial effect on dot spread. Where there are not surrounding pixels or ink dots to contain a solid ink dot, dot spread can be multiple times the original area of the dot laid down by the print head. Solid ink dots can also push adjacent ink drops into unoccupied adjacent positions, negatively affecting resolution. In solid ink printing, secondary colors, which are produced by the layering of two primary colors on top of one another, can bleed into neighboring primaries as much as primaries will bleed into unoccupied or "white" space. Thus, the expanded use of solid ink printing into office, wide format, medical imaging applications, and the continued use in graphics arts applications, provide the basis for a need to increase the resolution of printed images, while avoiding excessive dot spread or dot gain. These problems are solved in the printing process of the present invention by providing a clear wax base or a slightly grey colored wax base that is applied along the boundaries of colored or grey scale black ink drops to contain pixels and to achieve a higher resolution or grey scale solid ink output.

SUMMARY OF THE INVENTION

It is an aspect of the present invention that colored ink pixels or grey scale black pixels may be surrounded with a clear or slightly tinted light wax base to contain the pixels and prevent dot gain that reduces resolution.

It is another aspect of the present invention that some bit map post-processing may be employed to achieve higher resolution or a grey scale solid ink output by enhancing the transition between light colors and dark colors along printed edges.

It is another aspect of the present invention that the containing pixels are clear or slightly darker than white paper to permit dithering with other colors to increase the color gamut of the output obtained from the solid ink.

It is a feature of the present invention that a lightly tinted or a clear ink base is printed in a predetermined pattern by a print head in a thin border several pixels deep, adjacent colored or grey scale ink drops in an area where unprinted white space would normally occur.

It is another feature of the present invention that transitions from secondary colors to primary colors, or to white unprinted pixels, will have secondary colors border secondary colors and primary colors border primary colors by post bitmap processing to replace nonconforming edges so that primary colors border primary colors and secondary colors border secondary colors or darker grey scale colors border primary darker grey scale colors and lighter grey scale colors border lighter grey scale colors.

It is an advantage of the present invention that the method of printing by bordering colored or grey scale ink drops with clear or lightly tinted ink drops prevents dot gain.

It is another advantage of the present invention that the printing process can increase the color gamut of the output.

It is still a further advantage of the present invention that sharp colored edges or grey scale edges with distinct lightness to darkness transitions can be achieved.

It is yet another advantage in the present invention that the method is applicable to solid ink printing either in direct printing, offset, or indirect printing processes.

These and other aspects, features, and advantages are obtained by a printing process employing the use of a clear or lightly tinted ink along the boundaries or edges of the solid ink images to contain pixels and to achieve higher resolution or grey scale solid ink output without dot gain.

BRIEF DESCRIPTION OF THE DRAWINGS

These and other aspects, features and advantages of the invention will become apparent upon consideration of the following detailed disclosure of the invention, especially when it is taken in conjunction with the accompanying drawings wherein:

FIGS. 5A–D are diagrammatic illustrations of 6 by 1 pixel portions of the bitmaps before and after bitmap processing to improve a secondary to primary transition by removing a layer of pixels of a secondary grey scale level and using a darker grey scale pixel to achieve a more pronounced darkness to lightness transition in the output.

DETAILED DESCRIPTION OF THE PREFERRED EMBODIMENT

It is to be understood that the instant invention can be employed equally well in direct solid ink printing directly on to the receiving surface/substrate or indirect solid ink printing using an intermediate transfer surface. The following discussion will describe in detail the use of an indirect printing application.

Figure 1:
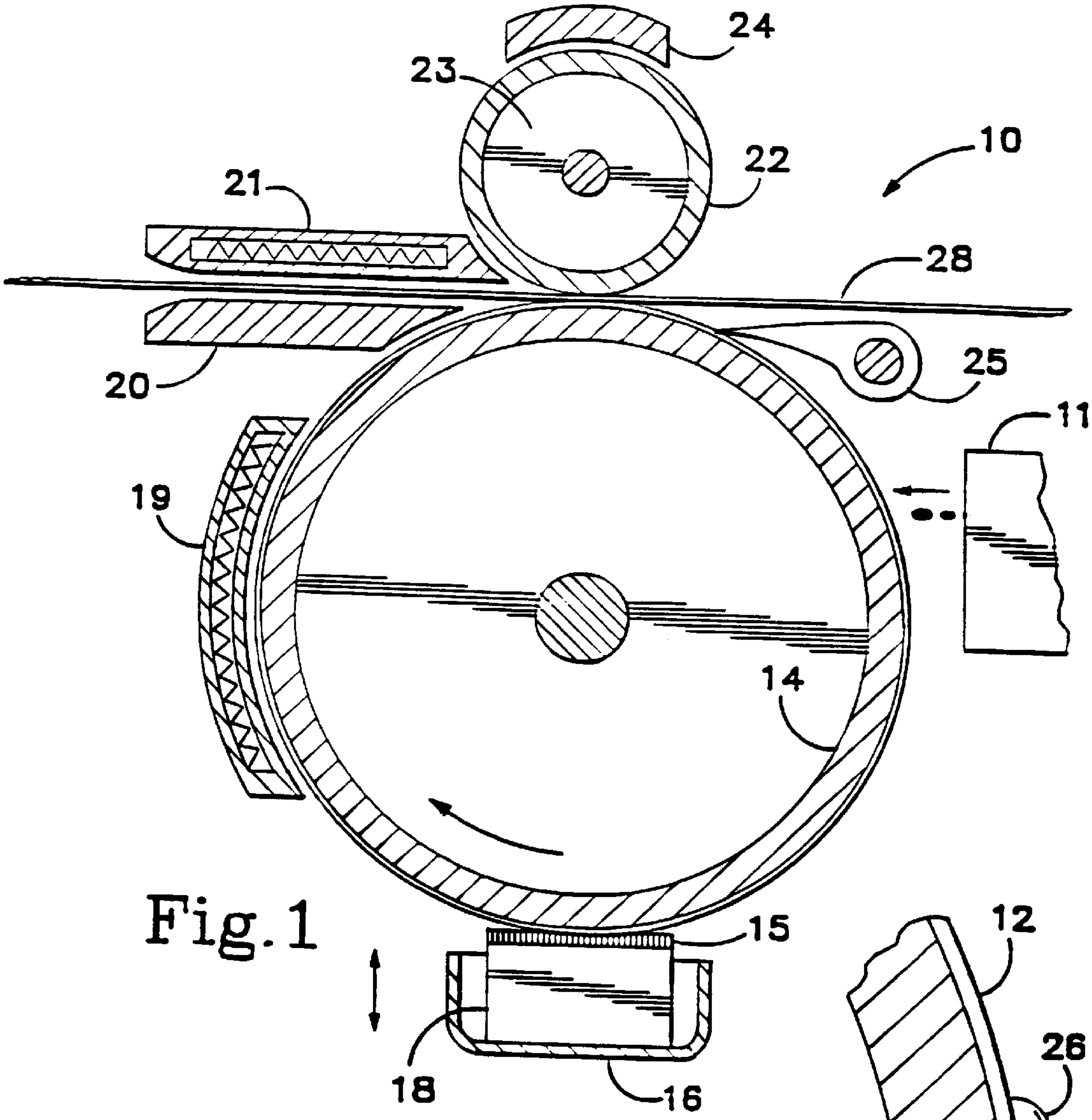
FIG. 1 is a diagrammatic illustration of an apparatus employing an indirect printing process with a supporting surface adjacent a liquid layer applicator and a print head to apply the image to be transferred to the liquid layer.
Figure 2:
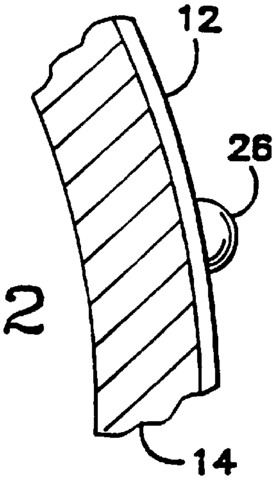
FIG. 2 is an enlarged diagrammatic illustration of the liquid layer of FIG. 1 acting as an intermediate transfer supporting the ink.

FIG. 1 discloses a diagrammatical illustration of the imaging apparatus 10 utilized in the instant process to transfer an inked image from an intermediate transfer surface to a final receiving substrate. A print head 11 is supported by an appropriate housing and support elements (not shown) for either stationary or moving utilization to place an ink in the liquid or molten state on the supporting intermediate transfer surface 12 of FIGS. 2 and 3. Intermediate transfer surface 12 is a liquid layer that is applied to the supporting surface 14, which is shown as a drum, but may also be a web, platen, or any other suitable design, by contact with an applicator, such as a metering blade, roller, web or the shown wicking pad 15 contained within applicator assembly 16. The supporting surface 14 may be formed from any appropriate material, such as metals including, but not limited to, aluminum, nickel or iron phosphate, elastomers, including but not limited to, fluoroelastomers, perfluoroelastomers, silicone rubber and polybutadiene, plastics, including but not limited to, polytetrafluoroethylene loaded with polyphenylene sulfide, thermoplastics such as polyethylene, nylon, and FEP, thermosets such as acetals or ceramics. Any appropriate material could be employed as long as the exposed surface is sufficiently rigid to deform the transferred image-forming ink 26 when the final receiving medium passes between it and the transfer and fixing roller 22 and it is sufficiently smooth so as not to interfere with the ability of the intermediate transfer surface or liquid layer to support the image-forming ink 26 of FIG. 2. The preferred material is anodized aluminum.

Applicator assembly 16 optionally contains a reservoir and wicking pad 15 for the liquid and most preferably contains a web and web advancing mechanism (both not shown) to periodically present fresh web for contact with the drum 14. Wicking pad 15 or the web is preferably any appropriate nonwoven synthetic textile with a relatively smooth surface. The web can be polyester. A preferred configuration can employ the smooth wicking pad 15 mounted atop a porous supporting material 18, such as a polyester felt. Both materials are available from BMP Corporation as BMP products NR 90 and PE 1100-UL, respectively. Applicator apparatus 16 is mounted for retractable movement upward into contact with the surface of drum 14 and downwardly out of contact with the surface of the drum 14 and its liquid layer 12 by means of appropriate mechanism, such as an air cylinder or an electrically actuated solenoid.

FIG. 1 shows a final substrate guide 20 that passes the final receiving substrate 28, such as paper, from a positive feed device (not shown) and guides it through the nip formed by the opposing arcuate surfaces of the roller 22 and the intermediate transfer surface 12 supported by the drum 14. Stripper fingers 25 (only one of which is shown) may be pivotally mounted to the imaging apparatus 10 to assist in removing any paper or other final receiving substrate media from the exposed surface of the liquid layer forming the intermediate transfer surface 12. Roller 22 has a metallic core, preferably steel with an elastomeric covering that has a 40 to 45 Shore D rating. Suitable elastomeric covering materials include silicones, urethanes, nitriles, EPDM and other appropriately resilient materials. The elastomeric covering on roller 22 engages the final receiving substrate 20 on the reverse side to which the ink image 26 is transferred from the exposed surface of the liquid layer forming the intermediate transfer surface 12. This fuses or fixes the ink image 26 to the surface of the final receiving surface so that the ink image is spread, flattened and adhered.

The ink utilized in the process and system of the instant invention is preferably initially in solid form and is then changed to a molten state by the application of heat energy to raise the temperature to about 85° C. to about 150° C. Elevated temperatures above this range will cause degradation or chemical breakdown of the ink. The molten ink is then applied in raster fashion from the ink jets in the print head 11 to the exposed surface of the liquid layer forming the intermediate transfer surface 12, where it is cooled to an intermediate temperature and solidifies to a malleable state in which it is transferred to the final receiving surface 28 via a contact transfer by entering the nip between the roller 22 and the liquid layer forming the intermediate transfer surface 12 on the support surface or drum 14. This intermediate temperature where the ink is maintained in its malleable state is between about 30° C. to about 80° C.

Once the solid malleable ink image enters the nip, it is deformed to its final image conformation and adheres or is fixed to the final receiving substrate either by the pressure exerted against ink image 26 on the final receiving substrate 28 by the roller 22 alone, or by the combination of the pressure and heat supplied by heater 21 and/or heater 19. Heater 24 could optionally be employed to supply heat to facilitate the process at this point. The pressure exerted on the ink image 26 is between about 10 to about 2000 pounds per square inch (psi), more preferably between about 500 to about 1000 psi, and most preferably between about 750 to about 850 psi. The pressure must be sufficient to have the ink image 26 adhere to the final receiving substrate 28 and be sufficiently deformed to ensure that light is transmitted through the ink image rectilinearly or without deviation in its path from the inlet to the outlet, in those instances when the final receiving substrate is a transparency. Once adhered to tile final receiving substrate 28, the ink image is cooled to ambient temperature of about 20–25 degrees Centigrade. The ink comprising the ink image must be ductile, or be able to yield or experience plastic deformation without fracture when kept at a temperature above the glass transition temperature. Below the glass transition temperature the ink is brittle. The temperature of the ink image in the ductile state is between about −10° C. and to about the melting point or less than about 85° C.

Figure 3:
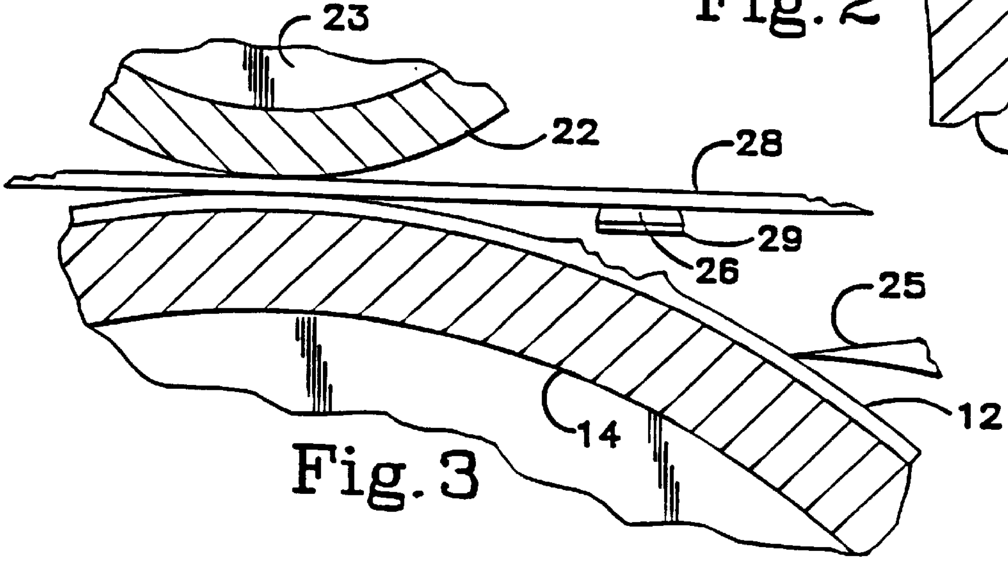
FIG. 3 is an enlarged diagrammatic illustration of the transfer of the inked image from the liquid intermediate transfer surface to the final receiving surface.

FIG. 3 diagrammatically illustrates the sequence involved when an ink image 26 is transferred from the liquid layer forming the intermediate transfer surface 12 to the final receiving substrate 28. As seen in FIG. 3, the ink image 26 transfers to the final receiving substrate 28 with a small, but measurable quantity of the liquid in the intermediate transfer surface 12 attached thereto as an outer layer 29. The average thickness of the transferred liquid layer 29 is calculated to be about 0.8 nanometers. Alternatively, the quantity of transferred liquid layer 29 can be expressed in terms of mass as being from about 0.1 to about 200 milligrams, and more preferably from about 0.5 to about 50 milligrams, and most preferably from about 1 to about 10 milligrams per page of final receiving substrate 28. This is determined by tracking on a test fixture the weight loss of the liquid in the applicator assembly 16 at the start of the imaging process and after a desired number of sheets of final receiving substrate 28 have been imaged.

Some appropriately small and finite quantity of the liquid in the liquid layer forming the intermediate transfer surface 12 also is transferred to the final receiving substate in areas adjacent the transferred ink image 26. This relatively small transfer of the liquid from the intermediate transfer surface 12 with the ink image 26 and to the non-imaged areas on the final receiving substrate 28 can permit multiple pages of the final receiving substrate 28 to be imaged before it is necessary to replenish the sacrificial liquid layer forming the intermediate transfer surface 12. Replenishment may be desired after each final imaged copy, depending on the quality and nature of the final receiving surface 28 that is utilized. Transparencies and paper are the primary intended media for image receipt. Commonly called "plain paper" is the preferred medium, such as that supplied by Xerox Corporation and many other companies for use in photocopy machines and laser printers. Many other commonly available office papers are included in this category of plain papers, including typewriter grade paper, standard bond papers, and letterhead paper. Xerox 4024 paper is assumed to be a representative grade of plain paper for the purposes of this invention.

While the thickness of the liquid layer forming the intermediate transfer surface 12 on the supporting surface or drum 14 can be measured, such as by the use of reflectance Fourier Transform infrared spectroscopy or a laser interferometer, it is theorized that the thickness can vary from about 0.05 microns to about 60 microns, more preferably from about 0.1 to about 50, and most preferably from about 1 to about 10 microns. The thickness of the layer forming the intermediate transfer surface 12 can increase if rougher surfaced supporting surfaces or drums 14 are employed. The surface topography of the supporting surface or drum 14 can have a roughness average ($R_a$) of from about 1 microinch to about 100 microinches, and a more preferred range of from about 5 to about 15 microinches. The image quality will degrade when a liquid layer thicker than about 60 microns is used to form the intermediate transfer surface 12.

Suitable liquids that may be employed as the intermediate transfer surface 12 include water, fluorinated oils, glycol, surfactants, mineral oil, silicone oil, functional oils or combinations thereof. Functional oils can include, but are not limited to, mercapto-silicone oils, fluorinated silicone oils and the like. The preferred liquid is a silicone oil.

The liquid layer 12 that forms the intermediate transfer surface on the surface of drum 14 is heated by an appropriate heater device 19. Heater device 19 may be a radiant resistance heater positioned as shown or, more preferably, positioned internally within the drum 14. Heater devices 21 and 24 can also be employed in the paper or final receiving substrate guide apparatus 20 and in the fusing and fixing roller 22, respectively. Heater device 19 increases the temperature of the liquid intermediate transfer surface from ambient temperature to between about 25° C. to about 70° C. or higher. This temperature is dependent upon the exact nature of the liquid employed in liquid layer or intermediate transfer surface 12 and the ink employed. A more preferred range is between about 30° C. to about 60° C., and a most preferred range is from about 45° C. to about 52° C.

Heater 21 preheats the final receiving medium prior to the fixation of the ink image by being set to heat between about 70° C. to about 200° C., more preferably to between about 85° C. and about 140° C., and most preferably to between about 110° C. to about 130° C. It is theorized that heater 21 raises the temperature of the final receiving medium to between about 90° C. and about 100° C. However, the thermal energy of the receiving media is kept sufficiently low so as not to melt the ink upon transfer to the final receiving substrate 28. Heater 24, when employed, heats the transfer and fixing roller 22 to a temperature of between about 25° C. and about 200° C. and, alternatively, may also be employed internally within roller 22.

The ink used to form the ink image 26 preferably must have suitable specific properties for viscosity. Initially, the viscosity of the molten ink must be matched to the requirements of the ink jet device utilized to apply it to the intermediate transfer surface 12 and optimized relative to other physical and rheological properties of the ink as a solid, such as yield strength, hardness, elastic modulus, loss modulus, ratio of the loss modulus to the elastic modulus, and ductility. The viscosity of the phase change ink carrier composition has been measured on a Ferranti-Shirley Cone Plate Viscometer with a large cone. At about 140° C. a preferred viscosity of the phase change ink carrier composition is from about 5 to about 30 centipoise, more preferably from about 10 to about 20 centipoise, and most preferably from about 11 to about 15 centipoise. The surface tension of suitable inks is between about 23 and about 50 dynes/centimeter. Appropriate ink compositions are described in U.S. Pat. No. 4,889,560 issued Dec. 26, 1989, and U.S. Pat. No. 5,372,852 issued Dec. 13, 1994, both assigned to the assignee of the present invention. Alternate phase change ink compositions with which the invention may be employed also include those described in U.S. Pat. No. 5,560,765, issued Oct. 1, 1996; U.S. Pat. No. 5,259,873, issued Nov. 9, 1993; and U.S. Pat. No. 4,390,360, issued Jun. 28, 1993.

While any phase change ink composition can be employed to practice the present invention, a preferred ink has a composition of comprising a fatty amide-containing material employed as a phase change ink carrier composition and a compatible colorant. The fatty amide-containing material comprises a tetraamide compound and a monoamide compound. The phase change ink carrier composition is in a solid phase at ambient temperature and in a liquid phase at elevated operating temperature. The phase change ink carrier composition can comprise from about 10 to about 50 weight percent of a tetraamine compound, from about 30 to about 80 weight percent of a secondary mono-amide compound, from about 0 to about 40 weight percent of a tackifier, from about 0 to about 25 weight percent of a plasticizer, and from about 0 to about 10 weight percent of a viscosity modifying agent.

Figure 4:
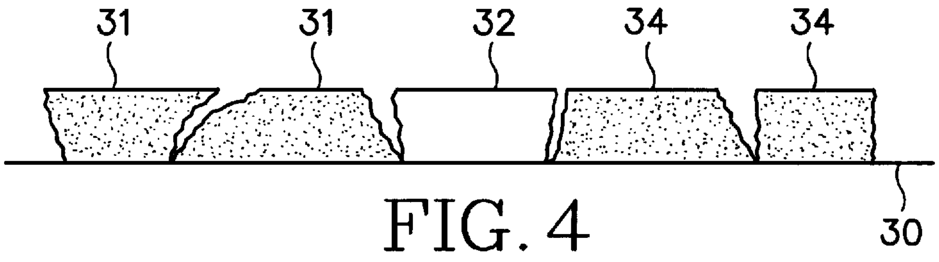
FIG. 4 is a diagrammatic illustration of the bordering of solid ink pixels by a clear or lightly tinted solid ink to contain the solid ink pixels and prevent dot gain or spread.

FIG. 4 shows in diagrammatic form, the placement of nonwhite solid ink drops 31 and 34 adjacent to what would be a white space or nonprinted ink space that is filled with a clear or light grey drop 32. The clear or lightly tinted drop 32 serves to contain the adjacent nonwhite solid ink drops 31 and 34 and prevent their spreading into what would have been the unprinted areas. Similarly, clear or light grey drops 32 may be employed one or more pixels deep along a boundary to contain an edge of solid ink drops to prevent their spreading.

FIG. 5A shows a 6 by 1 diagrammatic pixel cross-section wherein inks of four different levels of colored ink representing grey or black are indicated progressively, where the numeral three is the darkest colored grey and numeral zero is clear or a lightly colored ink pixel. FIG. 5A shows how the border has, by altering the processing of the bitmap, removed from the edge (indicated by the character "^") the lighter level of grey (level two indicated by the numeral "2") and replaced it with a single level of the darkest level of grey (level three indicated by the numeral "3") and bordered it by the lightest clear or lightly colored ink pixels, indicated by the numerals "0."

FIG. 5B shows a similar change where the secondary color pixel having the darkest level of grey (level three) and the underlying slightly lighter level of grey (level two) ink drops, is replaced by a single darkest level of grey (level three) that is bordered by clear ink drops (level 0) on both sides.

The FIGS. 5C and 5D show alternative approaches where multiple primary and secondary pixels are adjacent to one another and post bitmap processing serves to reduce the number of ink drops present by removing the lightest drop in the pixel chart to convert to a transition that replaces the secondary ink drop with a primary color that is the darkest of the two levels of grey ink drops placed one on top of the other, or alternatively, increases the number of ink drops by adding a layer of the darkest level of grey of the two levels of grey ink drops and separates them by the use of the lightest level of the grey ink drops to obtain a sharp transition from light to dark. This latter technique is especially helpful in grey scale printing for medical diagnostic imaging, where four different shades of blacks or greys are used in grey scale printing. Adjacent pixels should be interpreted to include the bordering pixels within a fixed distance from edges of light/dark transitions.

While the invention has been described above with references to specific embodiments thereof, it is apparent that many changes, modifications and variations in the materials, arrangements of parts and steps can be made without departing from the inventive concept disclosed herein. For example, in employing the present invention, all white pixels in a bitmap could be printed out or outputted as clear ink or as the lightest level of grey ink drops used.

Accordingly, the spirit and broad scope of the appended claims is intended to embrace all such changes, modifications and variations that may occur to one of skill in the art of the disclosure. For example, it is possible that the aspect of the invention relating to preventing ink dot gain or dot spread could equally well be applied to electrophotography where toner is used to create the imaged areas. Since the charge control agents and resin employed in toners are clear, it is possible to use a clear toner to contain the toner-formed image in electrophotography in a similar way to that employed with solid ink to reduce dot gain. All patent applications, patents and other publications cited herein are incorporated by reference in their entirety.

Having thus described the invention, what is claimed is:

1. A method of printing employing a phase change ink in an ink jet printer, the printer having a print head with multiple orifices through which ink drops are ejected onto a receiving surface to form at least one imaged area and non-imaged areas, the ink drops having multiple levels of color, the method of comprising the steps of:

a) forming at least one imaged area on the receiving surface with the ink drops having multiple levels of color ranging from a lightest level of color to a darkest level of color, the imaged area being bordered by non-imaged areas;

b) containing the at least one imaged area by applying the lightest level of color of ink drops in at least one non-imaged area adjacent and in non-overlapping relationship with the imaged area to contain the ink drops in the imaged area to prevent dot gain; and c) fusing the imaged area to a final receiving surface.

2. The method according to claim 1, further comprising applying a border of the lightest level of color of ink drops at least one pixel deep adjacent the imaged area to further contain the ink drops in the imaged area to prevent dot gain.

3. The method according to claim 2, further comprising the border completely filling the non-imaged areas.

4. The method according to claim 2, further comprising the border of lightest level of color of ink drops being clear ink drops.

5. The method according to claim 3, further comprising the multiple levels of color ranging from a black to a light grey.

6. The method according to claim 5, further comprising the lightest level of color of ink drops being light grey ink drops.

7. The method according to claim 1, further comprising the method being directly printing onto a final receiving surface.

8. The method according to claim 1, further comprising the method being indirectly printing onto an intermediate transfer surface and then to a final receiving surface.

9. The method according to claim 1, further comprising altering a bit map of the imaged and non-imaged areas to enhance transition from light to dark colors by having secondary colors border secondary colors and primary colors border primary colors.

10. A post bitmap processing method for use in a phase change ink jet printer having a print head with multiple orifices through which ink drops having multiple levels of color are ejected onto a receiving surface to form imaged and non-imaged areas, the method comprising the steps of:

a) forming at least one imaged area in a pixel bitmap chart for imaging on the receiving surface with ink drops having multiple levels of color ranging from a lightest level of color to a darkest level of color, the imaged area including secondary color pixels formed by placing two ink drops one on top of the other with top ink drops forming a top layer and bottom ink drops forming a bottom layer, the top ink drops being a lighter level of color or a darker level of color than the bottom ink drops;

b) post bitmap processing the pixel bitmap chart to increase the number of ink drops by using the lightest level of color to fill unimaged pixels in the top layer positioned between ink drops of dark levels of color to obtain a sharp transition in color from light to dark.

11. The method according to claim 10 further comprising creating a solid ink image on the receiving surface using the post bitmap processed pixel bitmap chart.

12. The method according to claim 11 further comprising transferring the solid ink image to a final receiving surface and fusing the image thereto.

13. A post bitmap processing method for use in a phase change ink jet printer having a print head with multiple orifices through which ink drops having multiple levels of color are ejected onto a receiving surface to form imaged and non-imaged areas, the method comprising the steps of:

a) forming at least one imaged area in a pixel bitmap chart for imaging on the receiving surface with ink drops having multiple levels of color ranging from a lightest level of color to a darkest level of color, the imaged area including secondary color pixels formed by placing two ink drops one on top of the other with top ink drops forming a top layer and bottom ink drops forming a bottom layer, the top ink drops being a lighter level of color or a darker level of color than the bottom ink drops;

b) post bitmap processing the pixel bitmap chart to decrease the number of ink drops by removing the lightest level of color of ink drops from the bottom layer and replacing individually the secondary color pixels with a single layer of primary color pixels that uses for each pixel location a darker level of color from the top layer of ink drops placed on top of the bottom layer of ink drops to obtain a sharp transition in color from light to dark.

14. The method according to claim 13 further comprising creating a solid ink image on the receiving surface using the post bitmap processed pixel bitmap chart.

15. The method according to claim 14 further comprising transferring the solid ink image to a final receiving surface and fusing the image thereto.

* * * * *

UNITED STATES PATENT AND TRADEMARK OFFICE

CERTIFICATE OF CORRECTION

PATENT NO. : 5,821,956
DATED : October 13, 1998
INVENTOR(S) : Stephen M. Kroon, et al.

It is certified that error appears in the above-identified patent and that said Letters Patent is hereby corrected as shown below:

Column 2, line 1, after "where" and before "is" insert --halftoning--.

Signed and Sealed this

Nineteenth Day of January, 1999

Attest:

Attesting Officer

*Acting Commissioner of Patents and Trademarks*